(12) United States Patent
Jang

(10) Patent No.: US 7,209,345 B2
(45) Date of Patent: Apr. 24, 2007

(54) CATHODE RAY TUBE CLAMP

(75) Inventor: Sam Jang, Morton Grove, IL (US)

(73) Assignee: Richco Inc., Morton Grove, IL (US)

( * ) Notice: Subject to any disclaimer, the term of this patent is extended or adjusted under 35 U.S.C. 154(b) by 0 days.

(21) Appl. No.: 10/685,855

(22) Filed: Oct. 16, 2003

(65) Prior Publication Data

US 2005/0083643 A1 Apr. 21, 2005

(51) Int. Cl.
*H05K 7/20* (2006.01)
*H01J 29/80* (2006.01)
*H04N 5/645* (2006.01)
*H01R 13/62* (2006.01)

(52) U.S. Cl. .................... 361/682; 361/815; 313/404; 313/440; 348/825; 348/829; 348/830; 348/836; 439/366

(58) Field of Classification Search .............. 361/682, 361/687, 690, 726, 727; 313/391, 438; 24/20 TT; 348/825, 829, 830
See application file for complete search history.

(56) References Cited

U.S. PATENT DOCUMENTS

| 3,582,848 | A | * | 6/1971 | Ryder et al. ................ 335/212 |
| 4,128,918 | A | * | 12/1978 | Wenk .......................... 24/16 R |
| 4,338,635 | A | * | 7/1982 | Haider et al. ............... 348/836 |
| 4,590,540 | A | * | 5/1986 | Nicholson et al. .......... 361/682 |
| 4,873,578 | A | * | 10/1989 | Tognoni et al. ............. 348/836 |
| 5,745,348 | A | * | 4/1998 | Cha ............................ 361/815 |
| 5,841,234 | A | * | 11/1998 | Jeong .......................... 315/85 |
| 5,963,275 | A | * | 10/1999 | Cho ............................ 348/836 |
| 5,963,432 | A | * | 10/1999 | Crowley ..................... 361/804 |
| 6,404,118 | B1 | * | 6/2002 | Park ........................... 313/440 |
| 6,624,563 | B1 | * | 9/2003 | Han et al. ................... 313/479 |
| 6,633,140 | B2 | * | 10/2003 | Lee ............................. 315/363 |
| 6,894,732 | B2 | * | 5/2005 | Kim et al. .................. 348/836 |

FOREIGN PATENT DOCUMENTS

KR 2001064188 * 7/2001

* cited by examiner

*Primary Examiner*—Lisa Lea-Edmonds
*Assistant Examiner*—Zachary Pape
(74) *Attorney, Agent, or Firm*—Martin Faier; James M. Faier; Faier & Faier P.C.

(57) ABSTRACT

A clamp for securing a printed circuit board on a cathode ray tube, in which the clamp has a split ring with overlapping jaws and teeth on each end of the jaws, wherein the jaws and teeth are adapted to engage and hold the clamp on the cathode ray tube, and wherein the clamp has an stand-off which is adapted for removably securing a printed circuit board on but spaced apart from the cathode ray tube. The split ring may be connected to but independent from the standoff so that movement of the clamp will not affect the position of the stand-off.

8 Claims, 5 Drawing Sheets

CATHODE RAY TUBE CLAMP

This invention relates to a new and novel Cathode Ray Tube ("CRT") Clamp, and is more particularly directed to such a device which is may be rigidly removably secured on the neck of a CRT tube for mounting a printed circuit board or other component on the tube.

BACKGROUND OF THE INVENTION

In assembling a television set or monitor, it is necessary and convenient to connect a printed circuit board or other component to the neck of a cathode ray tube ("CRT"). This connection must be rigid and be maintained during the life of the tube. For purposes of servicing, sometimes the printed circuit board is removed from the tube, and accommodation should be made for removal of the circuit board from the CRT.

Usually, in the prior art, the printed circuit board was connected to the neck of the CRT by means of a metal ring which could be tightened with a self taping or similar screw. Such an arrangement has been found to be cumbersome and may result in physical and/or electrical damage to the tube or circuit board, particularly during tightening of the screw. Also, the number of parts necessary to accomplish such securement of the printed circuit board on the neck of the CRT by means of a screw on a ring sometime resulted in the screw becoming loose over time, causing misalignment of the printed circuit board, and, additionally, required some care in maintaining inventory and arranging the parts for assembly and in the assembly of the connecting device onto the tube. The diameter of the yoke of some cathode ray tubes varies, and this variance in size can also cause problems for the connection of a device around its yoke.

Typical prior art yoke or CRT clamp arrangements are shown in Bickford U.S. Pat. No. 2,840,740, Cha et al U.S. Pat. No. 5,568,010, and Japan 200030634, and these devices have been used and/or modified to accommodate a printed circuit board or component. Such devices typify the difficulties in the prior art discussed above. Additionally, particularly when the assembled CRT and printed circuit board had to be moved, there was always the danger of a weak connection, which could become weaker during completion of assembly of the television or monitor and during transport of the assembled tube and printed circuit board.

SUMMARY OF THE INVENTION

The present invention offers a one piece solution to the problems noted above, by providing a one piece non-conductive plastic CRT clamp structured for rigid connection to the neck or yoke of a Cathode Ray Tube. Such a CRT clamp is molded or otherwise fabricated preferably from plastic in one piece. The yoke clamp of the present invention in some ways resembles prior art hose clamps, such as those disclosed in Wenk U.S. Pat. No. 4,128,918, Due U.S. Pat. No. 4,935,992 or Kruger U.S. Pat. No. 5,095,564, but those prior art hose clamps had no means or conception for removably but rigidly engaging a printed circuit board or component spaced apart from its mounting on a cathode ray tube, as is the case with the present invention.

In the present invention, the yoke clamp is characterized by a split ring with cooperating overlapping ends having teeth for securing the clamp around the neck of a cathode ray tube, and spaced away from the clamp and teeth, the device has a spaced apart legs which act as a stand-off for removably securing an apertured printed circuit board on the ends of the legs opposing the clamp. This arrangement provides secured means for detachably rigidly mounting a printed circuit board on the yoke clamp spaced apart from the cathode ray tube.

Another embodiment of the invention provides clamping means independent of the printed circuit board or component standoff, in such a way that the movement in the clamping mechanism will not cause the location of the standoff to change.

OBJECTS OF THE INVENTION

It is the object of the invention to provide a novel clamp of the character recited for mounting a printed circuit board or other component on a cathode ray tube.

Another object is to provide a novel clamp for a CRT preferably fabricated from plastic which has means for rigidly securely engaging the neck of the CRT.

Another object is to provide a novel clamp for a CRT which has integral stand-offs for securely detachably receiving an apertured printed circuit board spaced apart from but in alignment with a cathode ray tube on which the clamp is mounted.

Another object is to provide a novel one piece clamp for a CRT which has a clamping portion independent of its means for mounting a printed circuit board or other component.

Another object is to provide a novel one piece clamp for a CRT which is fabricated in one piece ready for use, without tools or fasteners.

Another object is to provide a novel clamp for removably rigidly securing a printed circuit board on the neck of a cathode ray tube which is simple and efficient in design and easy to manufacture by conventional molding and other technics.

BRIEF DESCRIPTION OF THE DRAWINGS

FIG. 6 is a perspective view of the modified clamp and CRT shown in FIG. 6.

DESCRIPTION OF A PREFERRED EMBODIMENT

Figure 1:
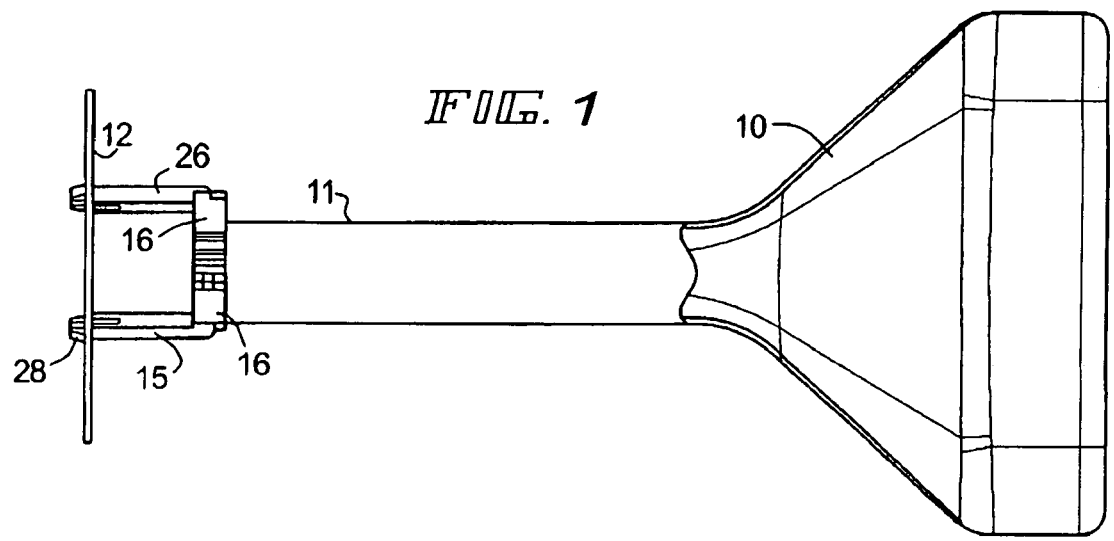
FIG. 1 is a view showing one embodiment of the novel clamp embodying the present invention carrying a printed circuit board and mounted on the neck of a cathode ray tube.
Figure 2:
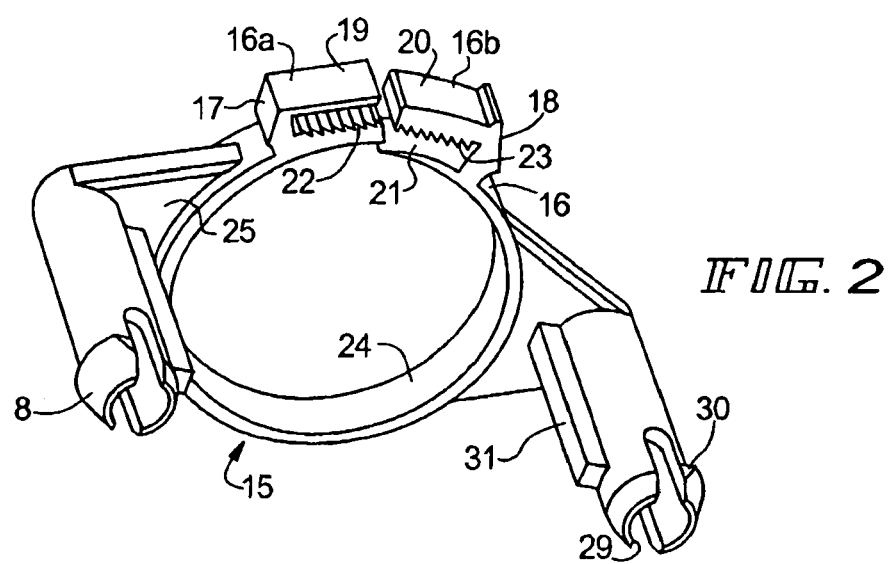
FIG. 2 is a perspective view the clamp embodied in FIG. 1, without the cathode ray tube or printed circuit board, viewed from the printed circuit board side of the device.
Figure 3:
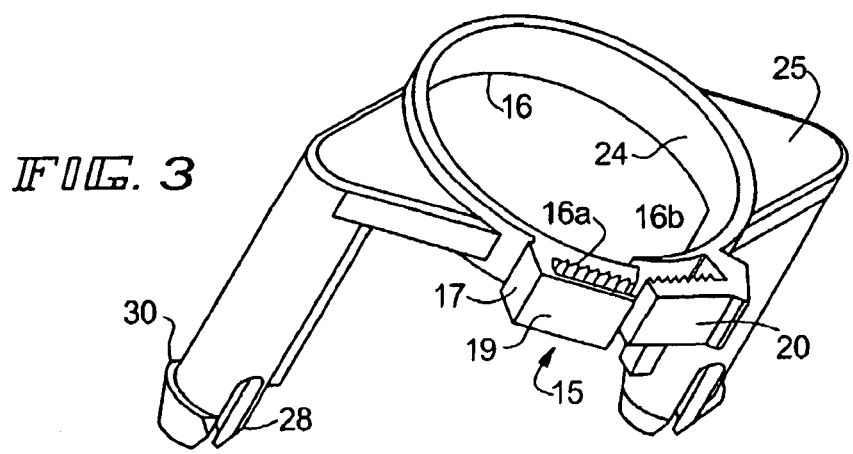
FIG. 3 is a a perspective view the clamp embodied in FIG. 1, without the cathode ray tube or printed circuit board, viewed from the CRT side of the device.
Figure 4:
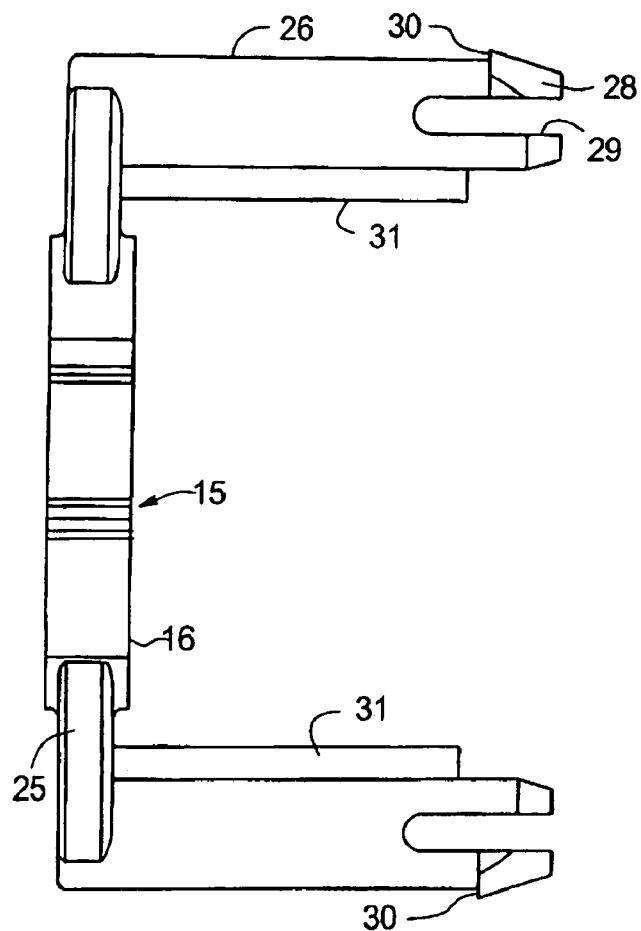
FIG. 4 is a side elevational view of the novel clamp embodiment shown in FIG. 1.
Figure 5:
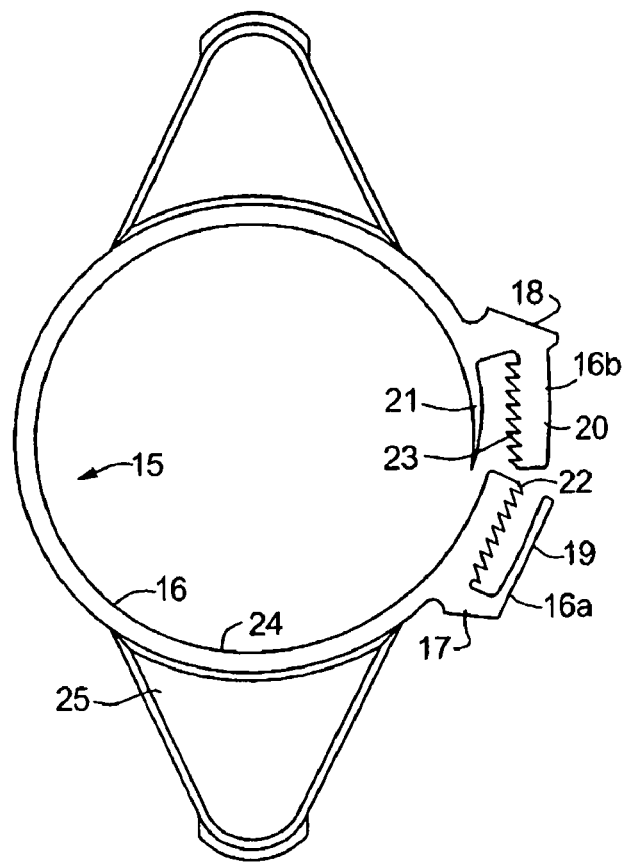
FIG. 5 is a top elevational view of the clamp embodiment shown in FIG. 1.

With reference to the accompanying drawings, and particularly to FIGS. 1–5, a cathode ray tube (CRT) 10 has arranged on its neck 11 a yoke clamp 15 embodying the present invention, and this yoke clamp carries a printed circuit board 12 for the cathode ray tube.

The yoke clamp 15, which is preferably molded or otherwise formed from plastic material, has an overlapping split ring 16 adapted to encircle the CRT neck 11. This split ring 16 has opposed jaws 16a and 16b on its ends, and the split ring on its external side where it is split has upstanding arms 17 and 18. One arm 17 has extending from it in the direction of the other arm 18 a finger 19. The other arm 18 has extending from it in the direction of and aligned with the other arm a finger 20 and a guide 21 spaced apart from the finger 20. The finger 19 has on its lower surface arranged in the direction of the split ring 16 a series of barbs or teeth 22, and the finger 20 has on its upper surface opposed to the direction of the split ring 16 a cooperating series of barbs or teeth 23. These teeth 22 and 23 are aligned so that when the ends of the split ring 16 are brought together around the neck 11 of the cathode ray tube, the teeth will engage and lock the yoke clamp onto the CRT neck.

In use, because of the shape and arrangement of the teeth 22, 23, the split ring 16 may be tightly drawn around the neck 11 of the CRT 10, which is fabricated from glass, and extra clamping force may be applied by urging the ends of the split ring together, and holding the position sought by means of moving the teeth an extra click. The glass CRT is very rigid, but the radially protruding teeth 20 and 21 flex to fully engage the CRT neck.

Preferably, the inside surface 24 of the split ring 16 is relatively wide, smooth and flat so it will firmly engage the CRT without twisting.

Extending away from and midway the opposed sides of the split ring 16 are wings 25, each of which has a stand-off 26 perpendicular to the wings substantially parallel to the neck 11 of the Cathode Ray Tube. At the end of each of these stand-offs 26 remote from its related wing 25 is a barbed head 28 defining a seat for connecting an apertured printed circuit board 12 to the yoke clamp 10 which is secured to the CRT. Each of these barbed heads 28 has a split side 29 terminating at the head, which permits the head to flex for insertion and removal of the board onto the barb. Each barbed head 28 has a projection 30 for engaging the top surface of a printed circuit board, and a rib 31 for engaging the opposed surface of the printed circuit board. This rib 31 not only engages the bottom of the board, but also maintains the stand-off rigid.

Figure 6:
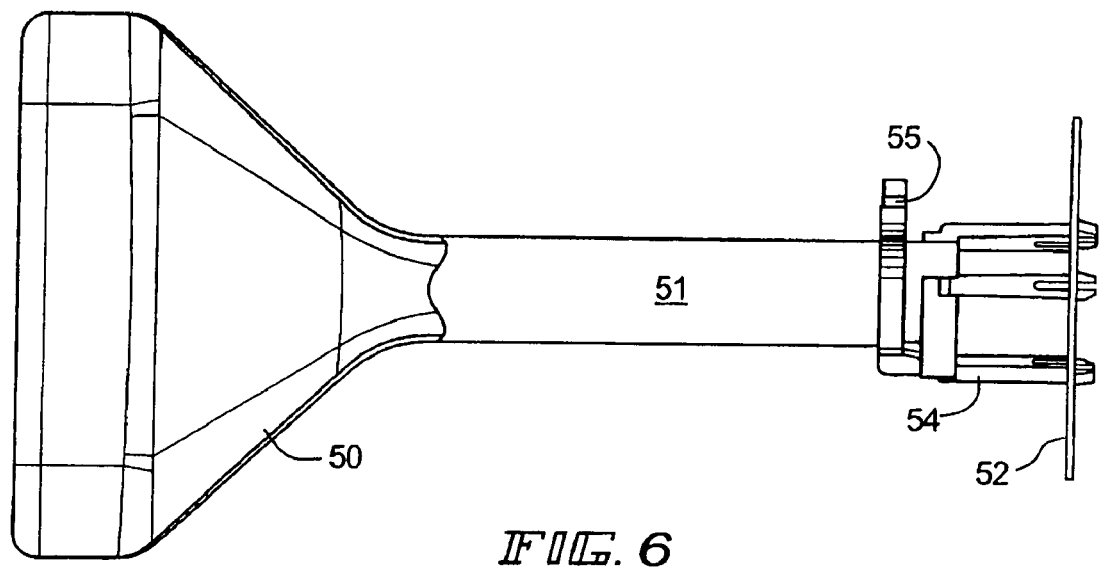
FIG. 6 is a view showing a second embodiment of the clamp embodying the present invention carrying a printed circuit board and mounted on the neck of a cathode ray tube.
Figure 7:
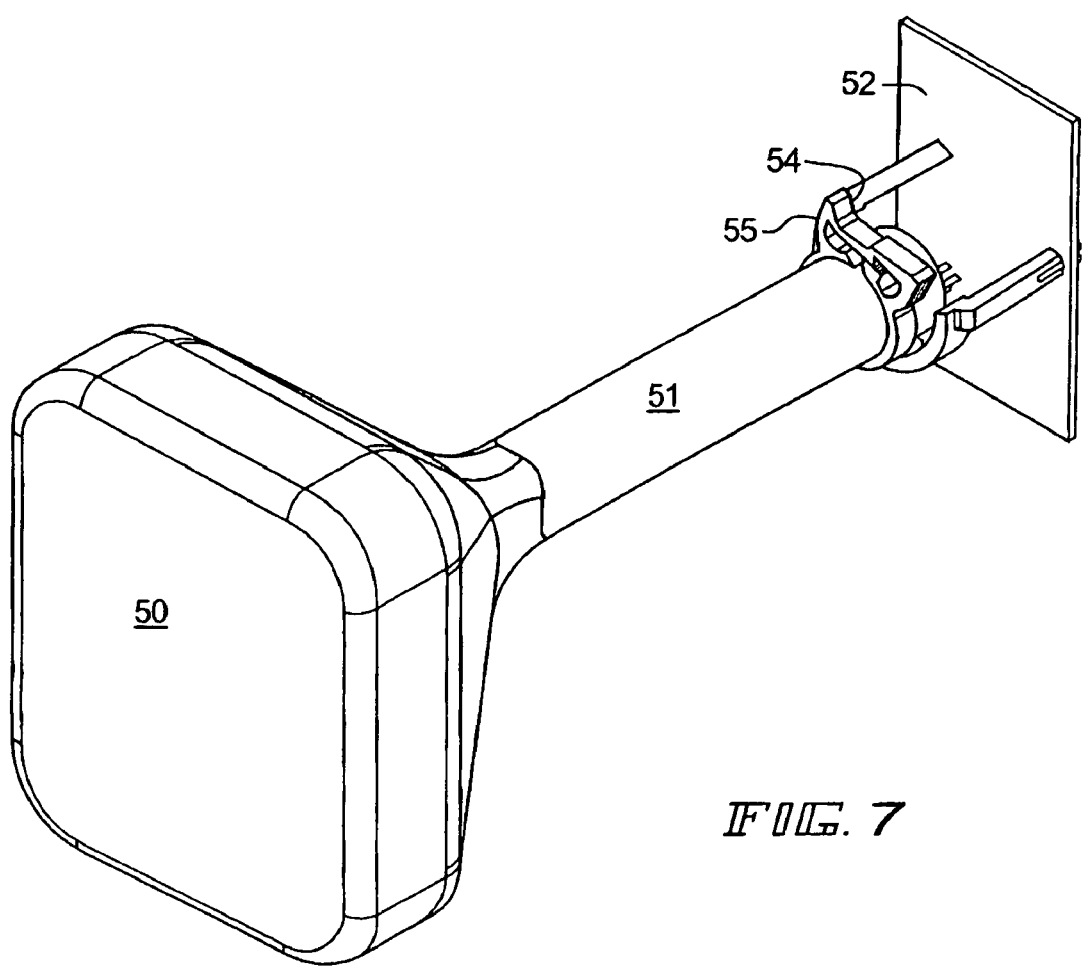
FIG. 7 is a side view of the modified clamp shown in FIG. 6.
Figure 8:
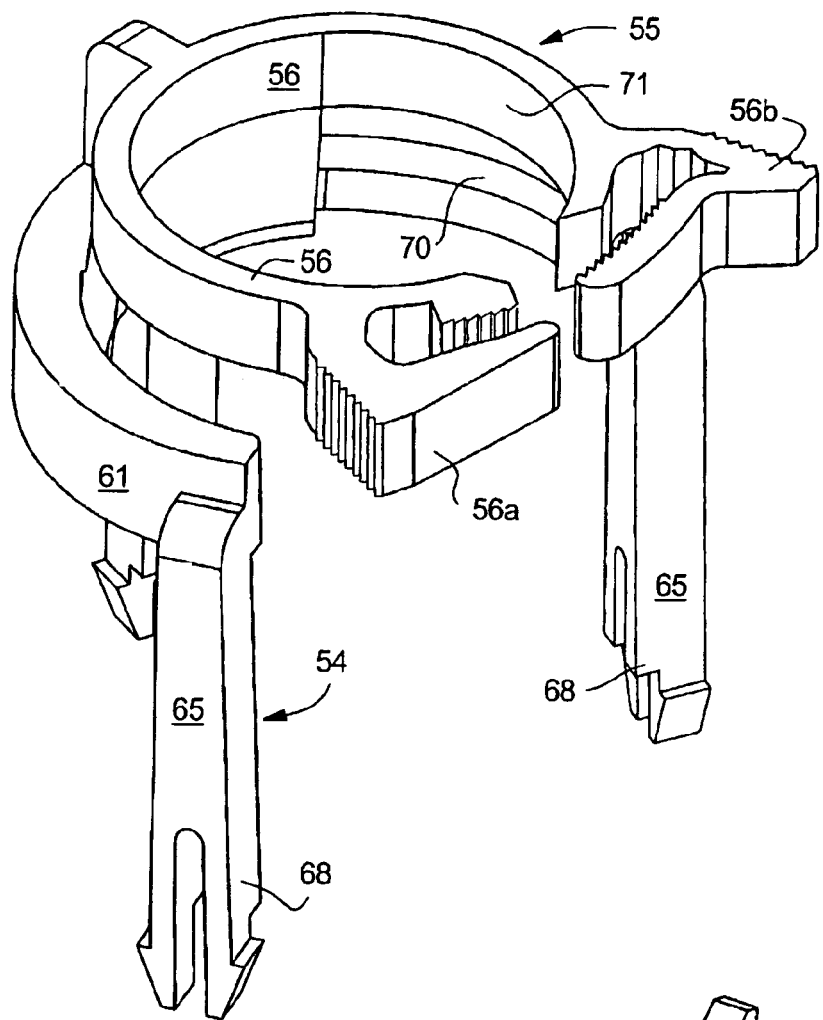
FIG. 8 is an enlarged perspective view of the modified clamp shown in FIG. 6.
Figure 9:
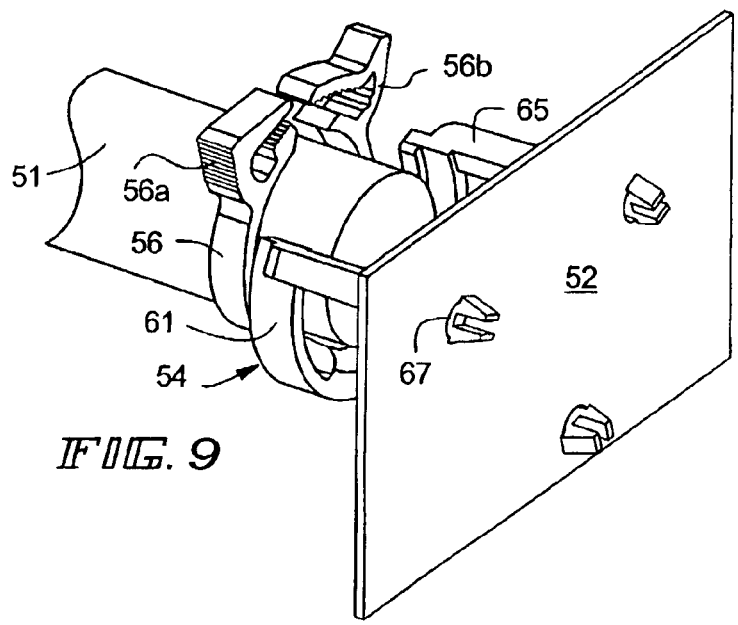
FIG. 9 is a perspective view of the modified clamp shown in FIG. 6 mounted on a CRT (partial) and carrying a circuit board.
Figure 10:
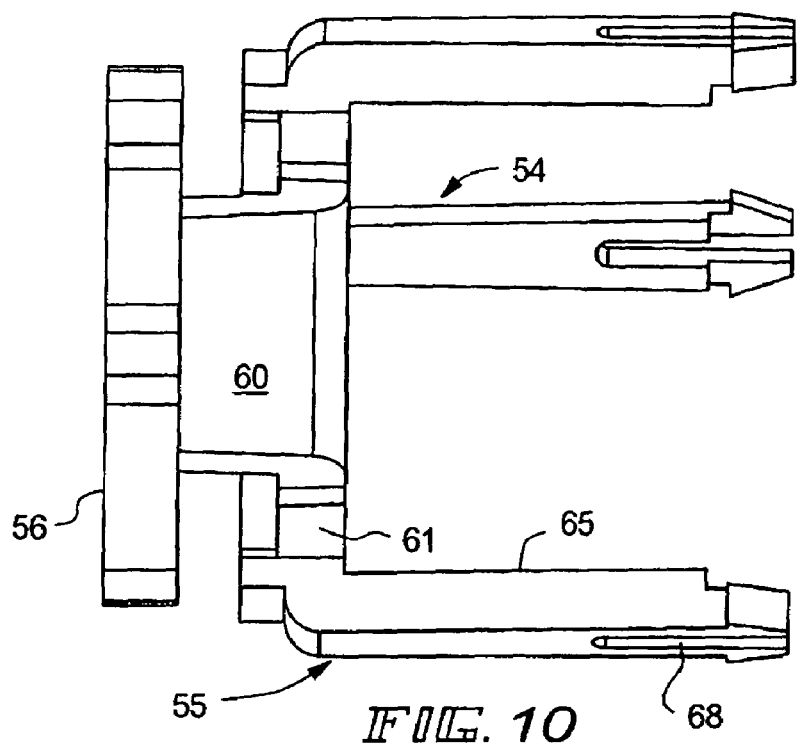
FIG. 10 is is a side elevational view of the novel clamp embodiment shown in FIG. 6
Figure 11:
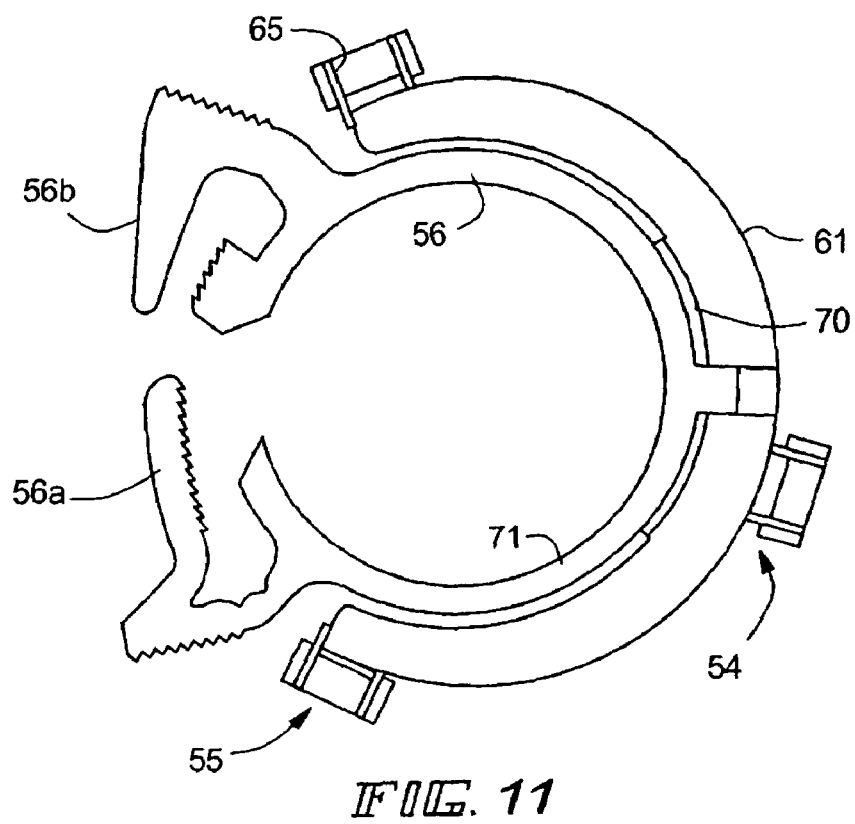
FIG. 11 is a top elevational view of the clamp embodiment shown in FIG. 6.

With reference to FIGS. 6–10, the modified novel clamp 55 is arranged on the neck or yoke 51 of a cathode ray tube 50, and carries a printed circuit board 52 or other component on its standoff portion 54. This clamp 55 has a split ring 56 adapted to encircle the CRT neck 51 independently of the standoff portion 54 receiving a printed circuit board 52. The split ring 56 has opposed jaws 56a and 56b on its ends, and is similar in its structure for encircling the CRT yoke to the embodiment shown in FIGS. 1–5.

In this FIG. 6–10 embodiment, a connecting leg 60 depends from the split ring 56 and is connected to the standoff portion 54. The standoff portion 54 has a split ring structure 61 spaced apart from but substantially parallel and concentric to the split ring 56, and carries spaced equidistantly apart standoff legs 65, each with a barbed head 68 for engaging an aperture 67 formed in a printed circuit board 52 or other component. Other conventional means for securing the printed circuit board 52 or component to a leg 65 or wing may be provided, such as a screw or other fastener for securing the printed circuit board to the end of the leg 65.

Preferably, it is also desirable to provide a relief 70 at least on one side of the split ring 56, so that its arm 71 may bend slightly when the clamps are tightened after the split ring bottoms out on the glass surface of the CRT yoke 51. The standoff portion 54 need not be cylindrical and need not have a hollow leg 65 or wing, as it may be rectangular and solid, as shown in FIGS. 6–10.

While a preferred embodiment of the invention has been shown in considerable detail, changes in the structure may be made without departing from the spirit or scope of the invention, and it is not intended that the invention be limited, except as limited by the appended claims.

The invention claimed is:

1. A yoke clamp for connecting a printed circuit board or other component to the neck of a cathode ray tube, said yoke clamp comprising:
   a split ring to encircle and hold around said cathode ray tube neck;
   connecting means at each end of said split ring including a cooperating series of barbs or teeth, the connecting means removably holding said split ring around said cathode ray tube neck; and
   wings extending from said split ring in a direction substantially angularly disposed to said cathode ray tube neck, the wings separating the split ring from a plurality of stand-offs,
   the plurality of sand-offs extending from said wings and maintaining the circuit board or other component a first distance away from the cathode ray tube neck and a second distance away from the split ring, and
   the plurality of stand-offs each having an end remote from said wings, the remote end including a barbed head and a seat for removably receiving and securing the circuit board on the clamp.

2. The clamp of claim 1, the clamp fabricated from plastic material in one piece.

3. The clamp of claim 1, at least one of the stand-offs having a longitudinally extending stiffener rib extending from the wing in a direction angularly disposed to said wing.

4. The clamp of claim 1, the stand-offs perpendicular to the wings and substantially parallel to the neck of the cathode ray tube.

5. The clamp of claim 1, the barbed head including a split side terminating at the head.

6. The clamp of claim 1, where the barbed head and the seat provide a means for removably receiving and securing the circuit board on the clamp.

7. The clamp of claim 1, where the shape of a cross-section of the stand-offs is selected from the group consisting of circular and rectangular.

8. The clamp of claim 1, where the second distance is greater than the first distance.

* * * * *